Figure 1:
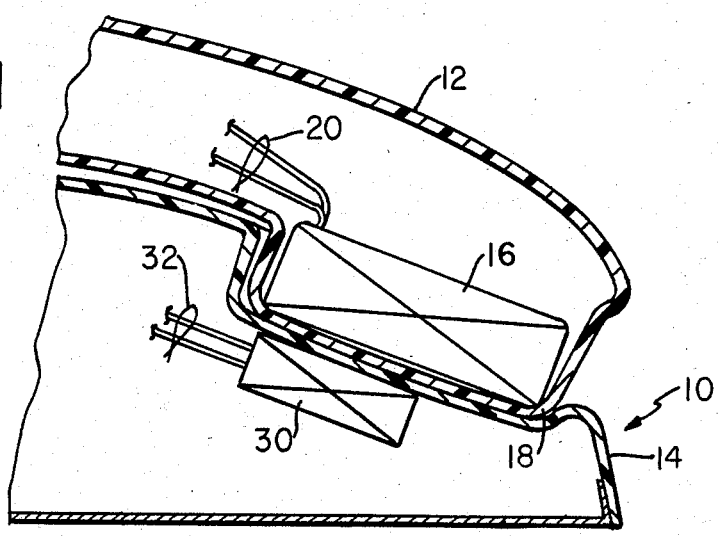

United States Patent [19]

Wenger

[11] Patent Number: 4,584,440
[45] Date of Patent: Apr. 22, 1986

[54] TELEPHONE DISCONNECT APPARATUS
[75] Inventor: Alexander A. Wenger, Melville, N.Y.
[73] Assignee: Eagle Telephonics, Inc., Plainview, N.Y.
[21] Appl. No.: 522,945
[22] Filed: Aug. 12, 1983
[51] Int. Cl.⁴ .............................................. H04M 1/06
[52] U.S. Cl. ................................................... 179/159
[58] Field of Search ................ 179/159, 158 R, 2 EA, 179/100 D, 100 R

[56] References Cited
U.S. PATENT DOCUMENTS
4,206,318  6/1980  Steely ................................... 179/159

Primary Examiner—Thomas W. Brown
Attorney, Agent, or Firm—Darby & Darby

[57] ABSTRACT

An electronic telephone disconnect apparatus uses a phase locked loop circuit containing a voltage control oscillator (VCO) to detect a signal at a frequency above the audible range, and the output of the VCO is coupled, through the normal connection wires, to the earpiece of the telephone handset. In close proximity to the location of the earpiece when the handset is in the off-hook condition, there is provided a pickup coil, which is coupled to the input of the phase locked loop. The phase comparator output of the phase locked loop then provides an indication of the hook state of the telephone. In the on-hook state, the earpiece is inductively coupled to the pickup coil, the VCO signal is thereby coupled back as an input signal to the phase locked loop, and it rapidly achieves lock, at which time the phase comparator indicates zero error. This corresponds to an on-hook indication. When the handset goes off-hook, the earpiece and pickup coil are separated, the inductive coupling is lost, and the phase locked loop loses lock. At this time, the phase comparator indicates a non-zero error signal representative of the off-hook condition. Inasmuch as the VCO provides both the signal to the earpiece and the reference signal to the phase comparator, the frequency produced at the earpiece and the frequency to which the phase locked loop responds are automatically matched, regardless of environmental conditions or aging.

13 Claims, 2 Drawing Figures

U.S. Patent Apr. 22, 1986 4,584,440

TELEPHONE DISCONNECT APPARATUS

The present invention relates generally to telephones and, more specifically, concerns an electrical apparatus for establishing the "on-hook/off-hook" condition of the telephone hand set without using a mechanical switch or moving parts.

Applicant has filed PCT Application No. PCT/US84/01288, Korean Application Ser. No. 84-4935, and Taiwanese Application No. 7315432 corresponding to this application.

The conventional telephone includes a, handset which the user holds against his head during use and a main body or base on which the hand set is rested when it is in an unused or "on-hook" position. In use, a handset is lifted from the base and is said to be in a "off-hook" position. The automatic and accurate detection of the "off-hook/on-hook" condition of a telephone is fundamental to the proper operation of the telephone and every telephone system. In the most familiar form of telephone, spring loaded plungers or a spring loaded lever arm are positioned to be engaged by and depressed as a result of the weight of the hand set when it is placed in the on-hook position. When the hand set is lifted and goes off-hook, the spring loading causes the plungers or lever arms to be raised, so that the plungers or lever arms assume one of two possible positions, corresponding, respectively, to the on-hook and off-hook condition of the telephone. The plungers or lever arm are mechanically coupled to an electromechanical switch within the base of the telephone, so that their position is automatically converted to an electrical signal representing the on-hook/off-hook condition of the telephone.

Mechanical off-hook/on-hook detection has proved to be far from satisfactory. With constant use, the spring loading on the plungers or lever arm may become ineffective, or the plungers or lever arm may become fouled by dirt and may stick in either the down or up position. In addition, the plungers or lever arm must be loosely located in a channel for movement, and the possibility exists that dust or liquid may find its way to the interior of the base through the channel and can damage the electromechanical switch or other electrical parts. The use of the electromechanical switch within the base is itself considered to be a disadvantage, since such switches are relatively complex and expensive and, as is the case with all components containing moving parts, have a limited lifetime and are prone to failure.

In an effort to overcome the disadvantages of mechanical hook switch systems, it has been suggested that radio frequency transmission may be used to detect the proximity of the handset to the telephone base, in order to determine the on-hook/off-hook condition of the telephone. This involves providing a radio frequency transmitter and a transmitting antenna within the handset, and a receiving antenna and a radio frequency detector within the base. The two antennas tend to be rather bulky metal components. In operation, the radio frequency transmitted generates a signal at a predetermined frequency and as a result of the proximity of the two antennas, this signal is provided to the radio frequency detector when the telephone is in the on-hook condition. The radio frequency detector is designed to be responsive to the frequency provided by the transmitter and, thereby, provides a signal indicating the on-hook condition of the telephone. When the handset is raised from the base, the distance between the two antennas is substantially increased and communication between them ceases. As a result, the radio frequency detector senses no received signal and indicates an off-hook condition.

Although the radio frequency proximity system solves many of the problems of mechanical hook switch detectors, it still has a number of shortcomings. Besides the apparent disadvantage of having to provide the two relatively large metal components to act as antennas, it also requires that the conventional, handset be modified to include a radio frequency oscillator therein. It then becomes necessary to provide batteries within the hand set or to provide additional wires to the handset to couple power to the oscillator. For this system to be reliable, the frequency of the oscillator must initially be closely matched to the detection frequency of the radio frequency detector. Furthermore, this frequency matching must be maintained in order to retain reliable operation. With varying environmental conditions and aging of components, the maintenance of such frequency matching is unlikely, and frequent adjustment or calibration would be necessary. This is a procedure involving relatively skilled labor, so that a system requiring calibration or adjustment is highly undesirable.

Broadly, it is an object of the present invention to determine the on-hook/off-hook condition of a telephone, without making use of mechanical switches or moving parts. It is specifically an object of the present invention to detect the proximity of a telephone handset to the telephone base by using only electrical and electronic means.

It is a further object of the present invention to provide a hook state determining apparatus of the type utilizing a radio frequency signal to detect proximity of the handset to the base, which apparatus avoids the shortcomings of prior art devices of this type.

It is yet another object of the present invention to provide a telephone hook state determining apparatus of the type utilizing a radio frequency signal, which apparatus does not require the use of large metal external components for antennas and which is free of any requirements for adjustment or calibration.

It is yet another object of the present invention to provide a hook state determining apparatus of the type utilizing a radio frequency signal, which apparatus can be used with a conventional handset, without requiring modification thereof, either to add electronic components or to couple a source of electrical power thereto.

It is also an object of the present invention to provide a hook state determining or telephone disconnect apparatus which is reliable and convenient in use, yet relatively inexpensive in construction.

In accordance with an illustrative embodiment demonstrating objects and features of the present invention, a phase locked loop circuit containing a voltage control oscillator (VCO) is used to detect a signal at a frequency above the audible range, and the output of the VCO is coupled, through the normal connection wires, to the earpiece of the telephone handset. In close proximity to the location of the earpiece when the handset is in the off-hook condition, there is provided a pickup coil, which is coupled to the input of the phase locked loop. The phase comparator output of the phase lock loop then provides an indication of the hook state of the telephone. In the on-hook state, the earpiece is inductively coupled to the pickup coil, the VCO signal is thereby coupled back as an input signal to the phase locked loop, and it rapidly achieves lock, at which time the phase comparator indicates zero error. This corresponds to an on-hook indication. When the handset goes off-hook, the earpiece and pickup coil are separated, the inductive coupling is lost, and the phase locked loop loses lock. At this time, the phase comparator indicates a non-zero error signal representative of the off-hook condition. Inasmuch as the VCO provides both the signal to the earpiece and the reference signal to the phase comparator, the frequency produced at the earpiece and the frequency to which the phase lock loop responds are automatically matched, regardless of environmental conditions or aging.

Figure 2:
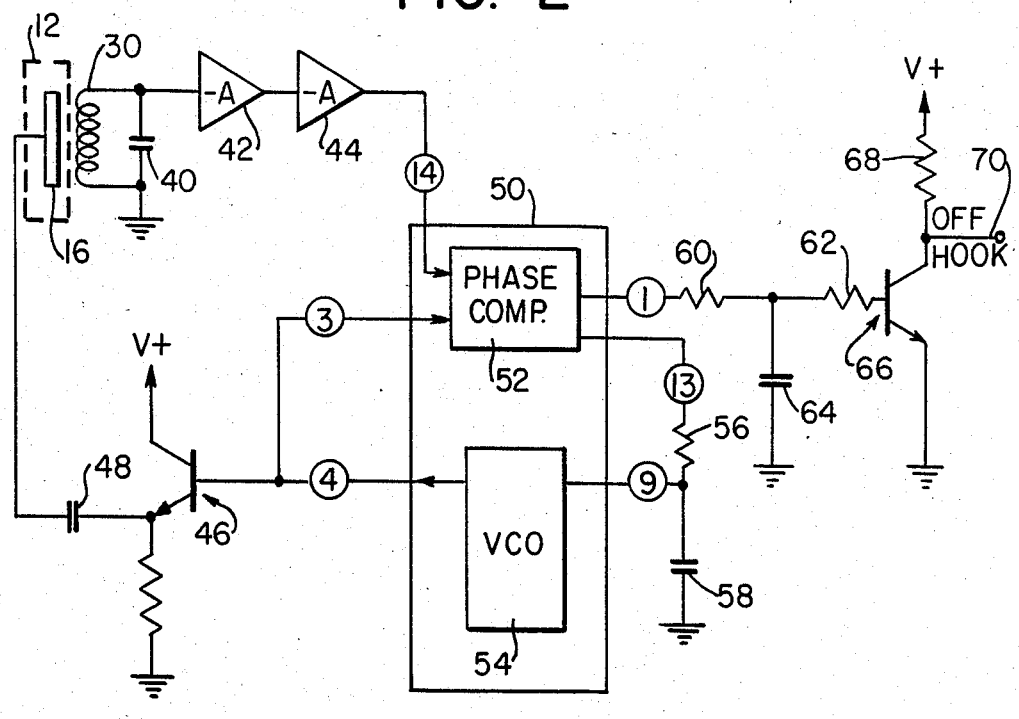

The foregoing brief description as well as further objects, features and advantages of the present invention will be more completely understood from the following detailed description of a presently preferred, but nonetheless illustrative, embodiment of the present invention, with reference being had to the accompanying drawings in which:

FIG. 1 is a partial sectional view of a telephone illustrating a preferred placement of the pickup coil in accordance with the present invention; and FIG. 2 is a schematic diagram illustrating the primary electrical features of the preferred embodiment of the invention.

Referring now to FIG. 1, there is disclosed a telephone 10 in which the present invention has been incorporated. The particular telephone illustrated is the type which is identified by the trademark "Princess Phone". For simplicity, the location and mounting of the electrical components comprising the invention are not shown in FIG. 1. These components could, however, be mounted within the phone by any conventional method, for example, on a circuit board mounted within the telephone. The telephone comprises the handset 12 and the base 14, both of which are conventional components, except that the base 14 does not include the usual opening provided for the hook switch activating lever, but is instead entirely closed. In FIG. 1, the handset is shown in its on-hook position on the base.

As is conventional, the handset 12 includes a conventional earpiece 16 which is mounted in a portion 18 of the handset that is normally held at the user's ear. The earpiece 16 is electrically connected to the base 14 by means of the line 20.

Within the base 14, there is mounted a pickup coil 30 in close proximity to the position of earpiece 16 when the handset is in the on-hook position. In operation, a signal at a frequency above the audible range is coupled to leads 20 and, as a result of the inductive coupling between a winding in the earpiece 16 and the pickup coil 30 when the handset is in the on-hook position, this signal will be transmitted to connecting leads 32 of pickup coil 30, for processing in accordance with the present invention. On the other hand, when the handset is in the off-hook position, earpiece 16 and pickup coil 30 would be too far apart for any appreciable inductive coupling to exist, so that the signal on leads 20 does not get transmitted to leads 32.

FIG. 2 is a circuit schematic diagram illustrating the electrical components involved in establishing an off-hook/on-hook signal for the telephone 10. In the preferred embodiment, all electrical components are mounted inside the base 14 by any conventional means, for example, on a printed circuit board. For clarity of description, conventional components, such as biasing resistors and ordinary filtering elements have been eliminated wherever possible without affecting the clarity of the description.

In the preferred embodiment, pickup coil 30 was realized by winding 350 turns of number 32 wire on a ⅝ inch bobbin and mounting the bobbin substantially as indicated in FIG. 1. A capacitor 40 is connected across the pickup coil 30 and its value is selected so that the parallel combination of the capacitor and pickup coil resonates at the nominal frequency selected for application to the earpiece 16, as discussed above.

The principal electrical component is an integrated circuit phase locked loop 50, which is preferably a type CD4046B integrated circuit manufactured by RCA Corporation. This integrated circuit is also shown in simplified form, with only the internal phase comparator 52 and voltage control oscillator 54 being indicated. In addition, the respective pins of phase locked loop 50 are represented by circles with numbers in them.

The resonant circuit comprising the coil 30 and capacitor 40 is coupled to the signal input (pin 14) of phase locked loop 50 through amplifiers 42 and 44, which are conventional amplifiers providing sufficient gain so that the input signal at pin 14 has a sufficient amplitude for processing by phase locked loop 50.

Within phase locked loop 50, the signal appearing at pin 14 is applied to phase comparator 52, the second input to which is the output frequency signal of the VCO, provided by connecting together pins 3 and 4. The VCO output, appearing at pin 4, is also coupled to an emitter-follower 46, which provides electrical isolation, and is coupled from the output of the emitter-follower onto leads 20, whereby it is provided to earpiece 16.

The output of phase comparator 52 appears at pin 13 and is coupled through a low pass filter, comprising resistor 56 and capacitor 58, to the control input of VCO 54 (pin 9). This completes the control loop provided by phase locked loop 50.

Phase comparator 52 has a second output on pin 1, which goes through a logical one level (i.e. a high level) when the phase locked loop 50 achieves lock. This pulse signal on pin 1 is coupled through a low pass filter, comprising resistors 60 and 62 and capacitor 64, to the base of a transistor switch 66, which is in a grounded emitter configuration. The collector of transistor 66 is coupled to the voltage supply V+ through a resistor 68, and the signal at the collector of transistor 66 is provided as the "off-hook" signal on output lead 70.

In operation, when handset 12 is in the on-hook position, the inductive coupling between earpiece 16 and pickup coil 30 completes a conductive path, including emitter-follower 46, capacitor 48, leads 20, and amplifiers 42 and 44, through which the frequency signal provided at pin 4 by VCO 54 is coupled back to input pin 14 of phase lock loop 50. Inasmuch as the input signal on pin 14 will always be the same as the reference signal on pin 3, phase locked loop 50 rapidly achieves lock, at which time the signal at pin 1 goes high. After some delay introduced by the integrating action of the low pass filter comprised of element 60, 62 and 64, the base of transistor 66 achieves a high enough level to turn on or saturate that transistor, whereby the collector of the transistor is pulled down to essentially ground, so that the off-hook signal on lead 70 assumes a logical zero (low) condition (indicative of an on-hook state).

When handset 12 goes off-hook, the increased separation between earpiece 16 and pickup coil 30 eliminates any appreciable conductive coupling therebetween, so that the signal transmission between pins 4 and 14 is interruptd. As a result, the input signal on pin 14 disappears and phase locked loop 50 rapidly goes out of lock, causing the signal on pin 1 to go low. After a delay introduced by the integrating action of the low pass filter comprising the elements 60, 62 and 64, the base of transistor 66 goes to a low level, thereby turning off the transistor. With the transistor turned off, essentially no current flows in resistor 68, and the signal on lead 70 goes up to the level of the power supply V+. This a logical one (high) level, indicating an off-hook condition. This off-hook binary signal appearing on lead 70 is conveniently used to control the operation of telephone 10 in the same manner as the signal provided by a mechanical hook switch.

By means of external components (not shown) selected in value and connected in accordance with conventional practice, the lock range of phase locked loop 50 is conveniently selected so as to be very narrow compared to the preferred nominal 35 kilohertz frequency of this oscillator. This lock range can be made substantially narrower than would otherwise be possible, because the same signal is applied to earpiece 16 and the reference input of phase comparator 52, so that it is not necessary to permit lock in a relatively broad range of frequencies to account for frequency variations between the signal in earpiece 16 and the referenced signal provided by VCO 54, as would be expected with prior art systems. The increased narrowness of the lock range minimizes the possibility of false disconnect (on-hook indications) resulting, for example, from external sources.

The primary purpose of the low pass filter comprising the elements 60, 62 and 64 is to avoid false on-hook or off-hook indications resulting from transient conditions.

Although a preferred form of the invention has been disclosed for illustrative purposes, those skilled in the art will appreciate that many additions, modifications and substitutions are possible without departing from the scope and spirit of the invention as defined in the accompanying claims. For example, it is not necessary to utilize any particular phase locked integrated circuit to achieve the purpose of the invention, or even to utilize a phase locked loop circuit. It will also be appreciated that, although the electronic components are most conveniently mounted within the base 14, the operation of the invention does not depend upon this feature.

I claim:

1. A disconnect apparatus for use with a telephone including a handset having an earpiece and a base adapted to receive the handset in an on-hook condition, said apparatus comprising:
   a controllable oscillator having a control terminal and providing an output signal, the frequency of which can be controlled by means of a signal applied to said control terminal;
   means coupling said oscillator output signal to said earpiece;
   comparator means jointly responsive to the output signal of said oscillator and a second input signal for producing an output signal assuming different conditions when said oscillator output and second input signals are alike and unalike, said output signal being electrically coupled to said oscillator control terminal and also being indicative of an on-hook condition; and
   pickup means mounted to be in close proximity to said earpiece when said handset is in its on-hook position for providing a transmission path for oscillator output signals coupled to said earpiece, said pickup means being electrically coupled to said comparator means to provide the second input signal thereto.

2. Apparatus in accordance with claim 1 wherein said oscillator produces a signal at a frequency beyond the range of audible frequencies.

3. Apparatus in accordance with claim 2 wherein said oscillator produces a signal at a frequency of 35 kilohertz.

4. Apparatus in accordance with claim 1 wherein said pickup means is a coil.

5. Apparatus in accordance with claim 1 wherein said oscillator is a voltage controlled oscillator.

6. Apparatus in accordance with claim 5 wherein said comparator means is a phase comparator, said comparator and voltage controlled oscillator cooperatively defining a phase locked loop.

7. A disconnect apparatus for use with a telephone including a handset having an earpiece and a base adapted to receive the handset in an on-hook condition, said apparatus comprising:
   an oscillator having a control terminal and providing an output signal at a predetermined frequency;
   means coupling said oscillator output signal to said earpiece;
   comparator means having an input terminal and an output terminal and being jointly responsive to the output signal of said oscillator and a signal applied to said input terminal for providing an output signal assuming different conditions when said oscillator output and input terminal signals are alike and unalike, the condition of said output signal being indicative of whether or not said handset is in the on-hook condition; and
   pickup means mounted to be in close proximity to said earpiece when said handset is in its on-hook position for providing a transmission path for oscillator output signals coupled to said earpiece, said pickup means being electrically coupled to said comparator means input terminal.

8. Apparatus in accordance with claim 7 wherein said oscillator produces a signal at a frequency beyond the range of audible frequencies.

9. Apparatus in accordance with claim 8 wherein said oscillator produces a signal at a frequency of 35 kilohertz.

10. Apparatus in accordance with claim 7 wherein said pickup means is a coil.

11. Apparatus in accordance with claim 7 wherein said comparator means is a phase comparator.

12. Apparatus in accordance with claim 7 wherein the comparator means is responsive to the frequencies of said oscillator output and said comparator means input terminal signals.

13. Apparatus in accordance with claim 6 wherein said comparator means and said oscillator are disposed in a single phase locked loop integrated circuit.

* * * * *